United States Patent
Kattakuri et al.

(10) Patent No.: US 11,731,263 B2
(45) Date of Patent: Aug. 22, 2023

(54) BRAKE APPARATUS, ROBOT JOINT AND ROBOT INCLUDING THE SAME

(71) Applicants: SHANGHAI FLEXIV ROBOTICS TECHNOLOGY CO., LTD., Shanghai (CN); FLEXIV LTD., Cayman Islands (GB)

(72) Inventors: Vikranth Reddy Kattakuri, Santa Clara, CA (US); Ran An, Santa Clara, CA (US)

(73) Assignees: SHANGHAI FLEXIV ROBOTICS TECHNOLOGY CO., LTD., Shanghai (CN); FLEXIV LTD., Cayman Islands (GB)

( * ) Notice: Subject to any disclaimer, the term of this patent is extended or adjusted under 35 U.S.C. 154(b) by 238 days.

(21) Appl. No.: 17/310,583

(22) PCT Filed: Sep. 22, 2020

(86) PCT No.: PCT/CN2020/116656
§ 371 (c)(1),
(2) Date: Aug. 12, 2021

(87) PCT Pub. No.: WO2022/061482
PCT Pub. Date: Mar. 31, 2022

(65) Prior Publication Data
US 2022/0088768 A1    Mar. 24, 2022

(51) Int. Cl.
*F16D 27/01*    (2006.01)
*B25J 9/00*    (2006.01)
(Continued)

(52) U.S. Cl.
CPC ............. *B25J 9/0009* (2013.01); *B25J 17/00* (2013.01); *F16D 63/006* (2013.01)

(58) Field of Classification Search
CPC ...... B25J 19/0004; B25J 9/0009; B25J 17/00; F16D 27/01; F16D 63/006
See application file for complete search history.

(56) References Cited

U.S. PATENT DOCUMENTS

| 10,086,512 B2 | 10/2018 | Aupperle |
| 2019/0341825 A1 | 11/2019 | Gildner et al. |

FOREIGN PATENT DOCUMENTS

| CN | 102458778 A | 5/2012 |
| CN | 202282721 U | 6/2012 |

(Continued)

OTHER PUBLICATIONS

International Search Report from International Application No. PCT/CN2020/116656 dated Jun. 29, 2021.

*Primary Examiner* — Randell J Krug
(74) *Attorney, Agent, or Firm* — Dorsey & Whitney LLP

(57) ABSTRACT

The present application provides a brake apparatus for a rotating component, a robot joint and a robot including the same. The brake apparatus includes: a locking component including a locking end provided with a first magnet; and a brake component including a mounting portion connected to the rotating component and a plurality of brake ends provided on the mounting portion along a circumferential direction of the mounting portion. Each of the plurality of brake ends is provided with a second magnet. A side of the first magnet facing the brake component is configured to have same polarity as sides of the second magnets facing the locking component. A distance from the first magnet to a rotary axis of the rotating component is substantially the same as distances from the second magnets to the rotary axis of the rotating component.

16 Claims, 11 Drawing Sheets

(51) Int. Cl.
*B25J 17/00* (2006.01)
*F16D 63/00* (2006.01)

(56) References Cited

FOREIGN PATENT DOCUMENTS

| | | | |
|---|---|---|---|
| CN | 103578684 | A | 2/2014 |
| CN | 104314929 | A | 1/2015 |
| CN | 105545995 | A | 5/2016 |
| CN | 205719571 | U | 11/2016 |
| CN | 107294349 | A | 10/2017 |
| CN | 108087461 | A | 5/2018 |
| CN | 109153115 | A | 1/2019 |
| CN | 109154344 | A | 1/2019 |
| CN | 109707768 | A | 5/2019 |
| CN | 208962041 | U | 6/2019 |
| CN | 111283663 | A | 6/2020 |
| CN | 210704822 | U | 6/2020 |
| CN | 210704822 | U * | 6/2020 |
| CN | 211039473 | U | 7/2020 |
| CN | 112123337 | A | 12/2020 |
| EP | 2960538 | A1 | 12/2015 |
| JP | 2011013088 | A | 1/2011 |
| KR | 20190074701 | A | 6/2019 |

* cited by examiner

BRAKE APPARATUS, ROBOT JOINT AND ROBOT INCLUDING THE SAME

TECHNICAL FIELD

The present application relates to braking technology, and in particular to a brake apparatus, a robot joint and a robot including the same.

BACKGROUND

Recently, robot technology has been growing very fast. Since robots can handle some highly precise, complex and repetitive tasks, and greatly reduce time of human operations and human efforts, robots are widely used in industrial production. In practical applications, generally, a brake apparatus can be provided in a robot to stop the robot's movement according to actual situations. The brake apparatus generally includes a locking component and a brake component mounted on a rotary shaft of an electric motor. For example, when the robot is energized, an engaging portion of the locking component may be trapped in the locking component and be separated from the brake component, and thus the electric motor runs normally. When the robot encounters a power outage or an emergency stop, the engaging portion is released by the locking component to engage with the brake component, thereby stopping the electric motor from rotating by frictional force and thus stopping the robot.

However, during the braking process as described above, when the engaging portion is released by the locking component to engage with the brake component, the engaging portion sometimes applies a large impact force on the brake component. For example, when the robot suddenly encounters a power outage, the brake component of the robot still rotates with the electric motor at a high speed due to inertia. Therefore, during the engagement of engaging portion with the brake component, the engaging portion is very likely to hit a surface of the brake component, causing undesirable deformation of the brake component, which accelerates wear of the brake component, shortens the service life of the brake component, and also brings undesirable safety effects on other parts of the robot, increasing the maintenance cost of the robot.

SUMMARY

According to various embodiments disclosed by the present application, a brake apparatus, a robot joint and a robot including the same are provided.

According to an aspect of the present application, a brake apparatus for a rotating component is provided. The brake apparatus includes: a locking component including a locking end provided with a first magnet; and a brake component including a mounting portion connected to the rotating component and a plurality of brake ends provided on the mounting portion along a circumferential direction of the mounting portion, wherein each of the plurality of brake ends is provided with a second magnet. Wherein, the locking end is configured to lock the brake component rotating with the rotating component according to a received brake instruction. A side of the first magnet facing the brake component is configured to have same polarity as sides of the second magnets facing the locking component. A distance from the first magnet to a rotary axis of the rotating component is substantially the same as distances from the second magnets to the rotary axis of the rotating component.

According to another aspect of the present application, a robot joint is provided. The robot joint includes: a housing; an electric motor including a rotor and a stator fixedly connected to the housing; and a brake apparatus configured to stop the rotor. The brake apparatus includes: a locking component including a locking end provided with a first magnet; and a brake component including a mounting portion connected to the rotor and a plurality of brake ends provided on the mounting portion along the circumferential direction of the mounting portion, wherein each of the plurality of brake ends is provided with a second magnet. Wherein, the locking end is configured to lock the brake component rotating with the rotor according to a received brake instruction. A side of the first magnet facing the brake component is configured to have same polarity as sides of the second magnets facing the locking component. A distance from the first magnet to a rotary axis of the rotor is substantially the same as distances from the second magnets to the rotary axis of the rotor.

According to yet another aspect of the present application, a robot is provided. The robot includes a plurality of connecting arms and a plurality of robot joints. The plurality of connecting arms are connected sequentially through the plurality of robot joints. Each of the plurality of robot joints is the robot joint as described above.

The details of one or more embodiments of the present application will be illustrated in the following drawings and description. Other features and advantages of the present application will become apparent from the description, drawings and claims.

BRIEF DESCRIPTION OF THE DRAWINGS

To more clearly describe the technical solutions of the embodiments of the present application, drawings required in the embodiments will be briefly introduced below. Apparently, the drawings in the following description are only some embodiments of the present application. For those of ordinary skill in the art, other drawings may be obtained from these drawings without creative work.

DETAILED DESCRIPTION OF THE EMBODIMENTS

In order to make the technical solutions and advantages of the present application clearer, the present application will be further illustrated in detail with reference to the accompanying drawings and embodiments. It should be understood that the specific embodiments described here are only used to illustrate the application, and not intend to limit the application.

Figure 1:
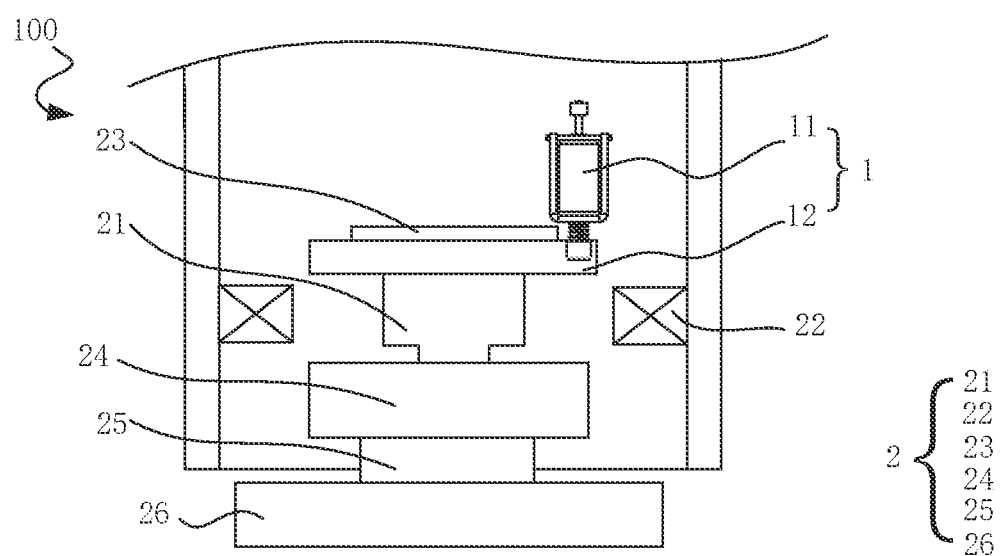
FIG. 1 is a schematic view of a structure of a robot joint including a brake apparatus according to an embodiment of present application.

Hereinafter, as an example, not a limitation, a brake apparatus applied in a robot will be described. FIG. 1 is a cross-sectional view of a brake apparatus 1 applied in a robot joint 100 according to an embodiment of present application, and shows the brake apparatus 1 in an activated state. Referring to FIG. 1, the robot joint 100 may include, for example, the brake apparatus 1 and a power mechanism 2. The power mechanism 2 may include a motor rotor 21, a motor stator 22, an encoder 23, a harmonic reducer 24, a torque sensor 25, and an output disc 26. A portion of the brake apparatus 1 is directly or indirectly connected to the motor rotor 21, such that when a brake instruction is received, the brake apparatus 1 can stop the power mechanism 2 by friction force. In some embodiments, the brake instruction may include an instruction received from, for example, a control unit (not shown), an instruction generated in a power outage situation, an instruction generated in an emergency stop situation, or the like.

Figure 2:
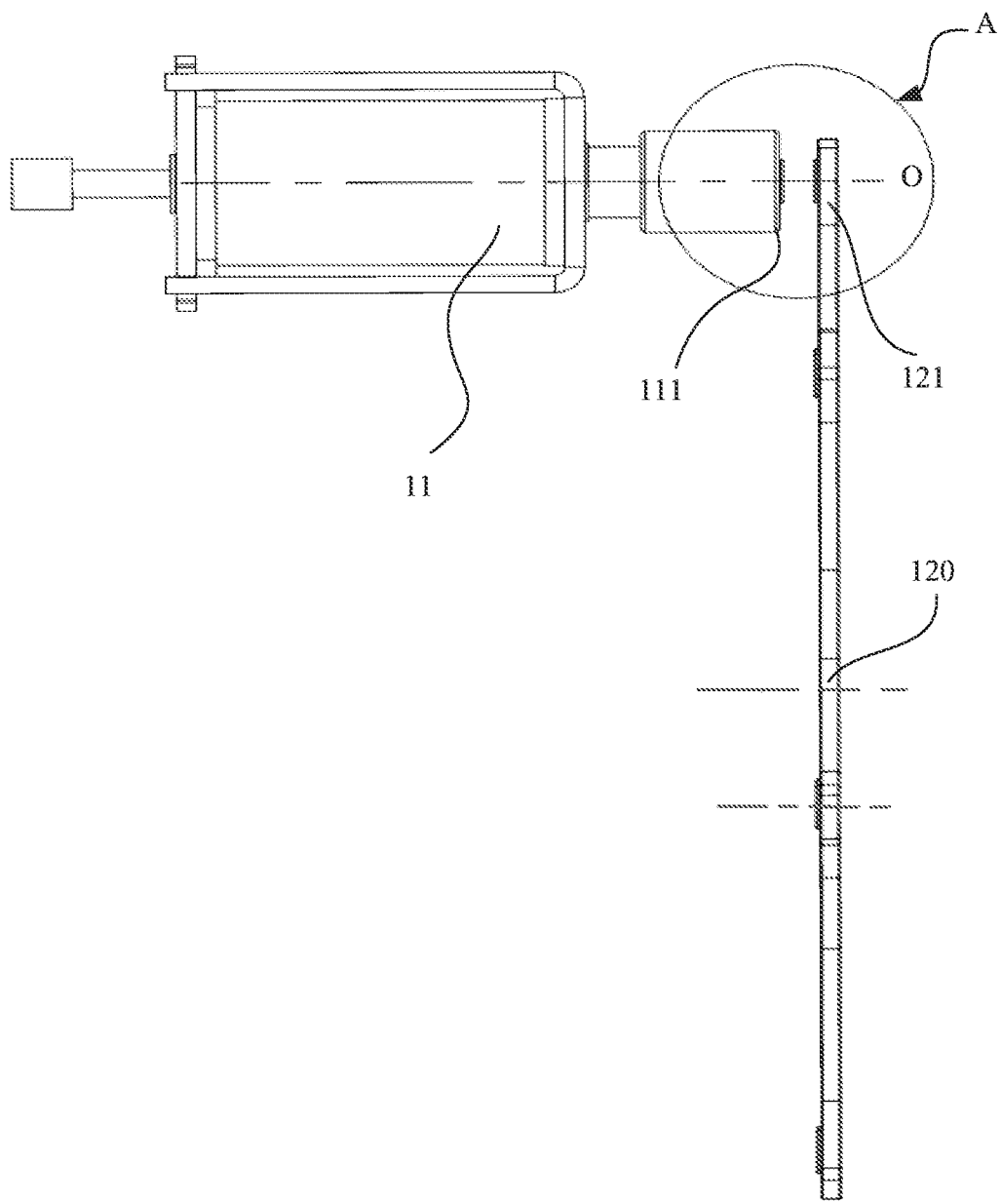
FIG. 2 is a schematic view of a brake apparatus according to an embodiment of present application.
Figure 3:
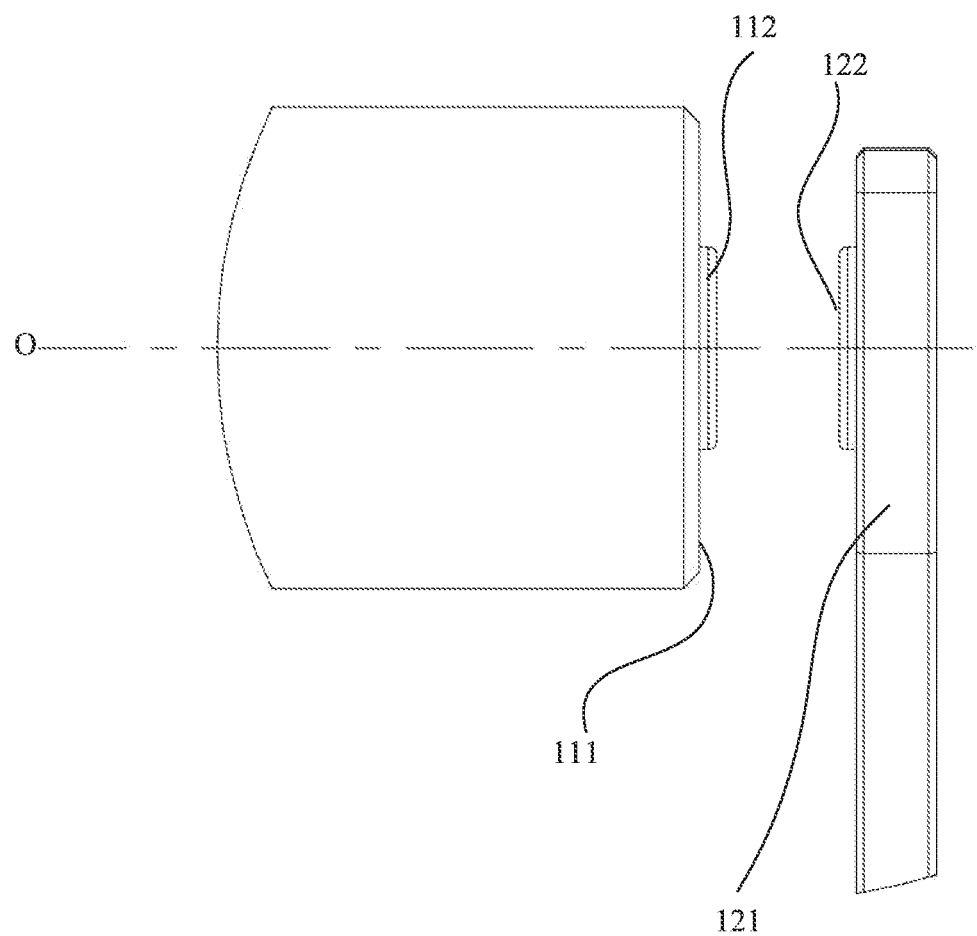
FIG. 3 is an enlarged view of a portion A shown in FIG. 2.

In some embodiments, as shown in FIGS. 2 and 3, the brake apparatus 1 may include a locking component 11 and a brake component 12. The locking component 11 may include a locking end 111. The locking end 111 is provided with a first magnet 112. The brake component 12 is provided with a plurality of second magnet 122. A side of the first magnet 112 facing the brake component 12 is configured to have same polarity as sides of the second magnets 122 facing the locking component 11. In other words, the side of the first magnet 112 facing the brake component 12 and the sides of the second magnets 122 facing the locking component 11 have same magnetic pole. A distance from the first magnet 112 to a rotary axis of the motor rotor 21 can be substantially the same as distances from the second magnets 122 to the rotary axis of the motor rotor 21, to ensure that the repulsive force can be generated between the first magnet 112 and the second magnets 122 when the first and second magnets 112 and 122 face each other.

In some embodiments, the first magnet 112 may be disposed on the locking end 111 through adhesive, interference fit, threaded coupling or the like. The structure of the locking component 11 may be the same as or similar to an electromagnetic switch known in the prior art. For example, the locking component 11 may be a solenoid.

Figure 4:
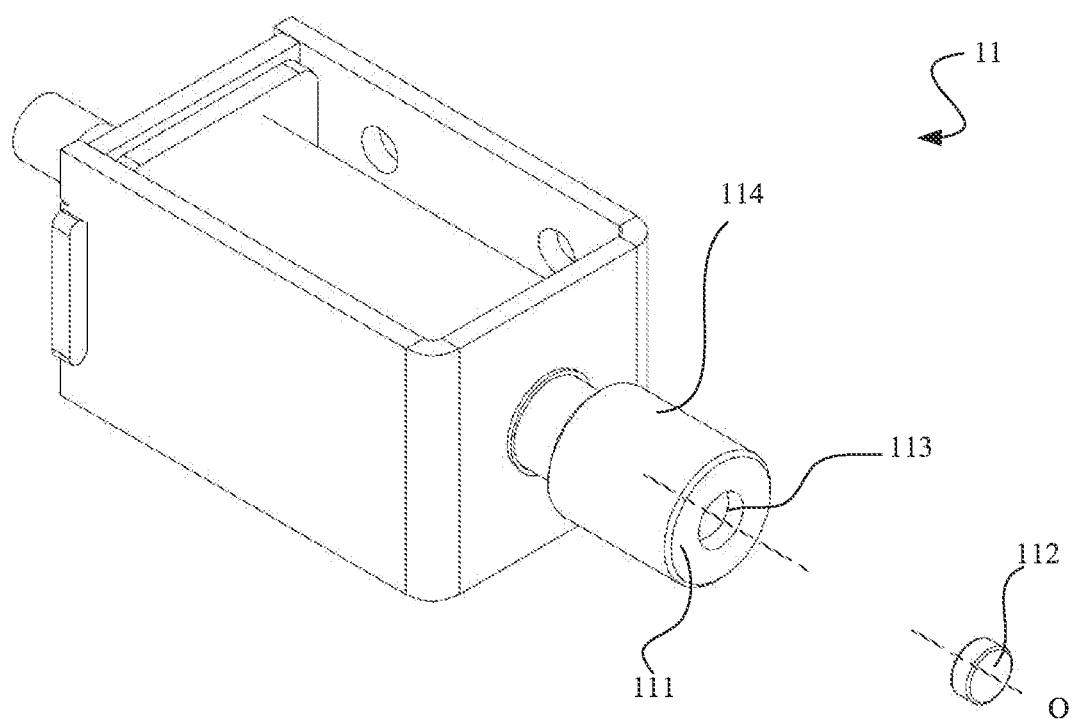
FIG. 4 is an exploded view of a locking component shown in FIG. 2.

In some embodiments, as shown in FIG. 4, the locking end 111 may define a first opening 113. The first magnet 112 may be disposed in the first opening 113. For example, the first magnet 112 may be disposed in the first opening 113 through adhesive, interference fit, threaded coupling or the like.

In some embodiments, the first magnet 112 may be cylindrical, and correspondingly, the first opening 113 may be cylindrical. Through such a configuration, since the first magnet 112 can have an axially symmetrical shape, the first magnet 112 can generate a uniform magnetic field, making the operation of the brake apparatus 1 more stable and effective. However, the shapes of the first magnet 112 and the first opening 113 are not limited thereto, and any shapes of the magnet and corresponding opening that can enable a stable repulsive force between the magnets can be applied to the present application.

Figure 5:
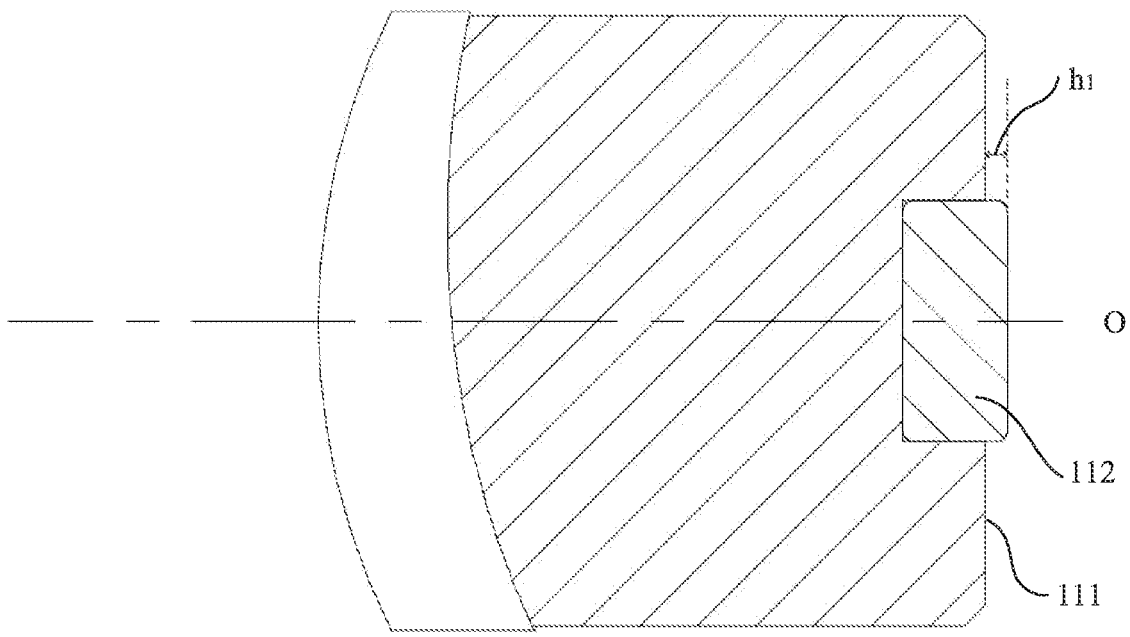
FIG. 5 is a schematic view of a cross section of a locking shaft provided with a first magnet according to an embodiment of present application.
Figure 6:
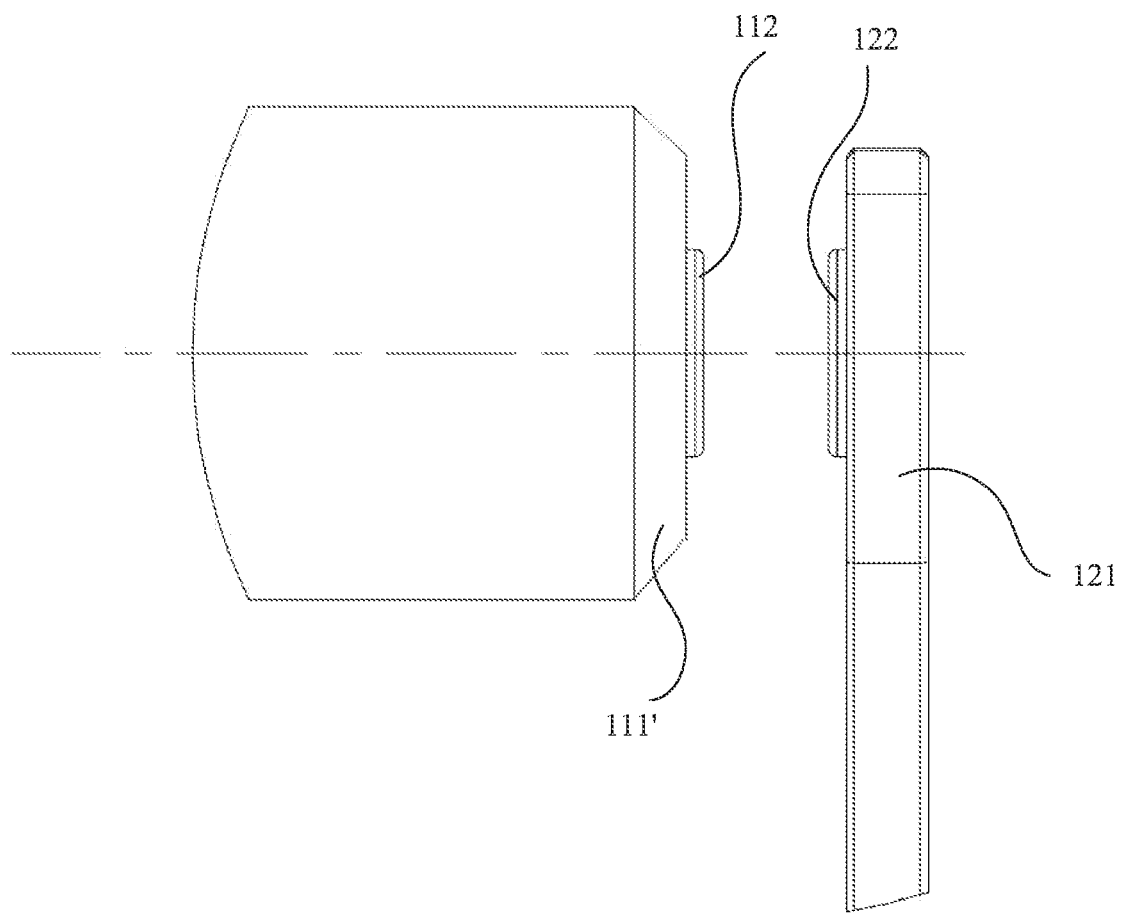
FIG. 6 is a schematic view of a brake apparatus according to another embodiment of present application.

In some embodiments, the locking end 111 is a portion of a locking shaft 114 of the locking component 11. An ideal mounting state of the first magnet 112 is that an axis of the first magnet 112 coincides with an axis of the locking shaft 114, and herein, the coincided axes may be referred to as a first ideal axis (for example, an axis O in FIG. 3). However, in practical applications, due to manufacturing or assembling errors, there may be a first positional deviation and a first orientation deviation. The first positional deviation may be a first positional deviation caused by, for example, the fact that the first magnet 112 is mounted such that its axis deviates from the first ideal axis in parallel. The first orientation deviation may be a first axis tilt caused by, for example, the fact that the first magnet 112 is mounted such that its axis is tilted with respect to the first ideal axis, and/or a combination of the first axis tilt and the first positional deviation. Therefore, in this application, the distance from the first magnet 112 to the rotary axis of the motor rotor 21 being substantially the same as the distances from the second magnets 122 to the rotary axis of the motor rotor 21 may include the presence of the first positional deviation and/or the first orientation deviation. In order to avoid undesirable attraction force between the first magnet 112 and the brake component 12 and/or between the locking shaft 114 and the second magnet 122 caused by poorly control of such first positional deviation and first orientation deviation, the first magnet 112 may protrude a first distance $h_1$ from the locking end 111, as shown in FIG. 5. The first distance $h_1$ can reduce the attractive force between the first magnet 112 and the brake component 12 and/or between the locking shaft 114 and the second magnet 122, and increase the repulsive force between the first magnet 112 and the brake component 12 and/or between the locking shaft 114 and the second magnet 122. In some other embodiments, the locking shaft 114 of the locking component 11 and/or the brake component 12 may be made of non-magnetic materials such as stainless steel or aluminum alloy, so as to avoid the attractive force between the first magnet 112 and the brake component 12 and/or between the locking shaft 114 and the second magnet 122. In some other embodiments, a chamfer of the locking end can be increased to reduce the possibility of generating the attractive force between the first magnet 112 and the brake component 12 and/or between the locking shaft 114 and the second magnet 122, as shown in FIG. 6, the locking end 111' has a truncated cone shape facing the brake component 12. In some examples, the locking end 111 having the shape of the truncated cone may be further shaped to securely receive the first magnet 112 therein. Through this configuration, an increased range of the first orientation deviation when the first magnet 112 is mounted is acceptable, thereby reducing the requirement for tighter orientation deviation. Therefore, such a configuration can facilitate positioning and mounting the first magnet 112, thereby reducing the difficulty of mounting the first magnet 112.

Figure 7:
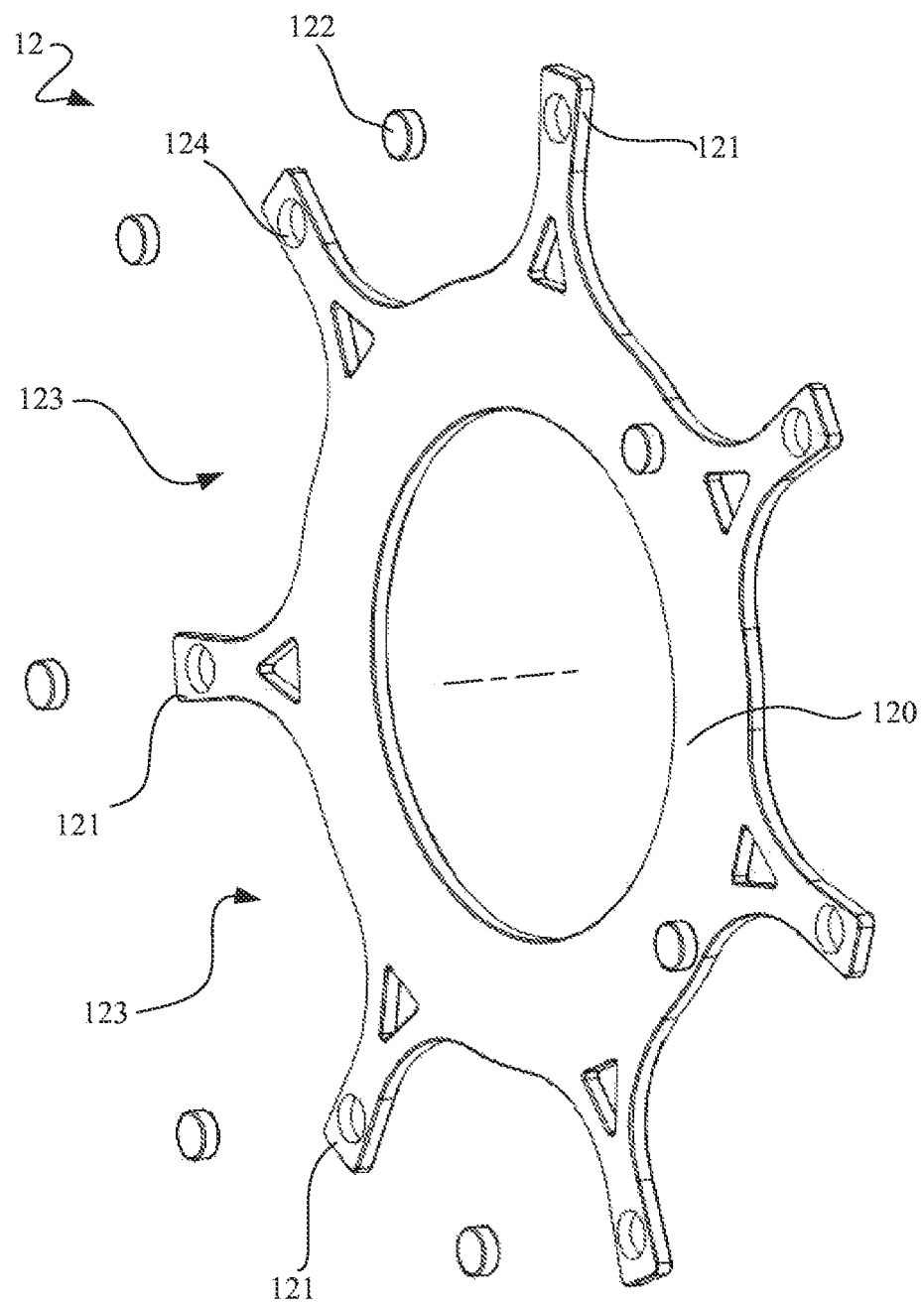
FIG. 7 is an exploded view of a brake component shown in FIG. 2.

In some embodiments, as shown in FIGS. 2 and 7, the brake component 12 may include a mounting portion 120 and a plurality of brake ends 121 provided on the mounting portion 120 along a circumferential direction of the mounting portion. The mounting portion 120 is configured to directly or indirectly connect to the motor rotor 21. For example, as shown in FIG. 1, the mounting portion 120 of the brake component 12 may be mounted on a rotary shaft of the motor rotor 21. The plurality of brake ends 121 may be uniformly provided on the mounting portion 120 of the brake component 12 along the circumferential direction of the mounting portion. Each of the plurality of brake ends 121 is provided with a second magnet 122.

During the operation of the robot joint 100, according to the received brake instruction, the locking end 111 can lock the brake component 12 rotating with the motor rotor 21 to prevent the brake component 12 from rotating, or release the brake component 12, that is, not to prevent the brake component 12 from rotating. When the locking component 11 locks the brake end 121 of the brake component 12, the brake component 12 can stop the motor rotor 21 by the friction force. For example, when the locking end 111 locks the brake component 12 according to the received brake instruction, the locking end 111 can lock the brake component 12 by extending into a gap 123 between two adjacent brake ends 121. For example, the locking end 111 can be inserted into the gap 123 between two adjacent brake ends 121 to engage with the brake end 121, so as to complete the locking of the brake component 12.

For a conventional brake apparatus, during the locking and braking process, since the brake component still rotates with the rotary shaft of the motor rotor at a high speed due to the inertia, the locking component is very likely to hit the brake end of the brake component. In contrast, in such a braking process, the brake apparatus 1 according to the present application can prevent the locking end 111 of the locking component 11 from hitting the brake end 121 of the brake component 12 by virtue of the repulsive force of the same magnetic poles of the first magnet 112 and the second magnet 122. The repulsive force between the first and second magnets 112 and 122 ensures that the locking end 111 falls into the gap 123 between the two adjacent brake ends 121 during the locking process, so as to prevent rotation of the brake component 12 by the engagement between the locking end 111 and the brake end 121 in the circumferential direction of the brake component 12. Therefore, smooth engagement between the locking component 11 and the brake component 12, i.e., smooth braking of the brake apparatus 1 is facilitated according to the present application.

In some embodiments, the second magnets 122 may be disposed on the plurality of brake ends 121 through adhesive, interference fit, threaded coupling or the like. The brake component 12 may be, but not limited to, for example, a spoke wheel, a sprocket or the like.

In some embodiments, each brake end 121 may define a second opening 124. The second magnet 122 may be disposed in the second opening 124. For example, the second magnet 122 may be disposed in the second opening 124 through adhesive, interference fit, threaded coupling or the like.

In some embodiments, the second magnet 122 may be cylindrical, and correspondingly, the second opening 124 may be cylindrical. Through such a configuration, since the second magnet 122 can have an axially symmetrical shape, the second magnet 122 can generate a uniform magnetic field, making the operation of the brake apparatus 1 more stable and effective. However, the shapes of the second magnet 122 and the second opening 124 are not limited to a cylindrical shape, and any shapes of the magnet and corresponding opening that enable a stable repulsive force between the magnets can be applied to the present application.

In some embodiments, an ideal mounting state of the second magnets 122 is that, at certain moments during the rotation of the brake component 12, an axis of the second magnet 122 coincides with the axis of the locking shaft 114, and herein, the coincided axes may be referred to as a second ideal axis. However, in practical applications, due to manufacturing or assembling errors, there may be a second positional deviation and a second orientation deviation. The second positional deviation may be a second positional deviation caused, by, for example, the fact that the second magnet 122 is mounted such that its axis deviates from the second ideal axis in parallel. The second orientation deviation may be a second axis tilt caused by, for example, the fact that the second magnet 112 is mounted such that its axis is tilted with respect to the second ideal axis, and/or a combination of the second axis tilt and the second positional deviation. Therefore, in this application, the distance from the first magnet 112 to the rotary axis of the motor rotor 21 being substantially the same as the distances from the second magnets 122 to the rotary axis of the motor rotor 21 may further include the presence of the second positional deviation and/or the second orientation deviation.

Figure 8:
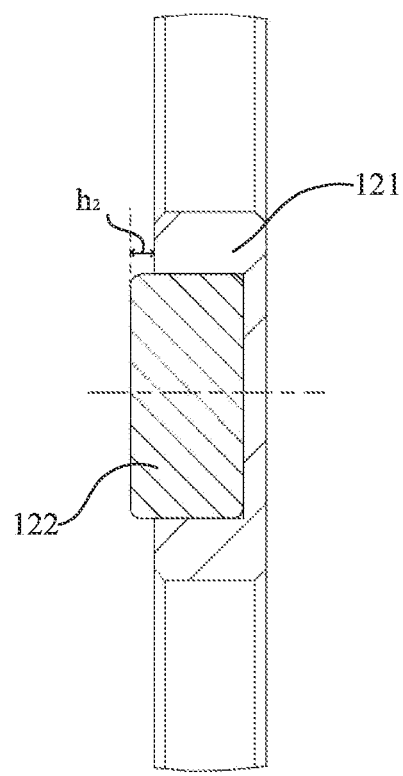
FIG. 8 is a schematic view of a cross section of a brake end of the brake component shown in FIG. 7.
Figure 9:
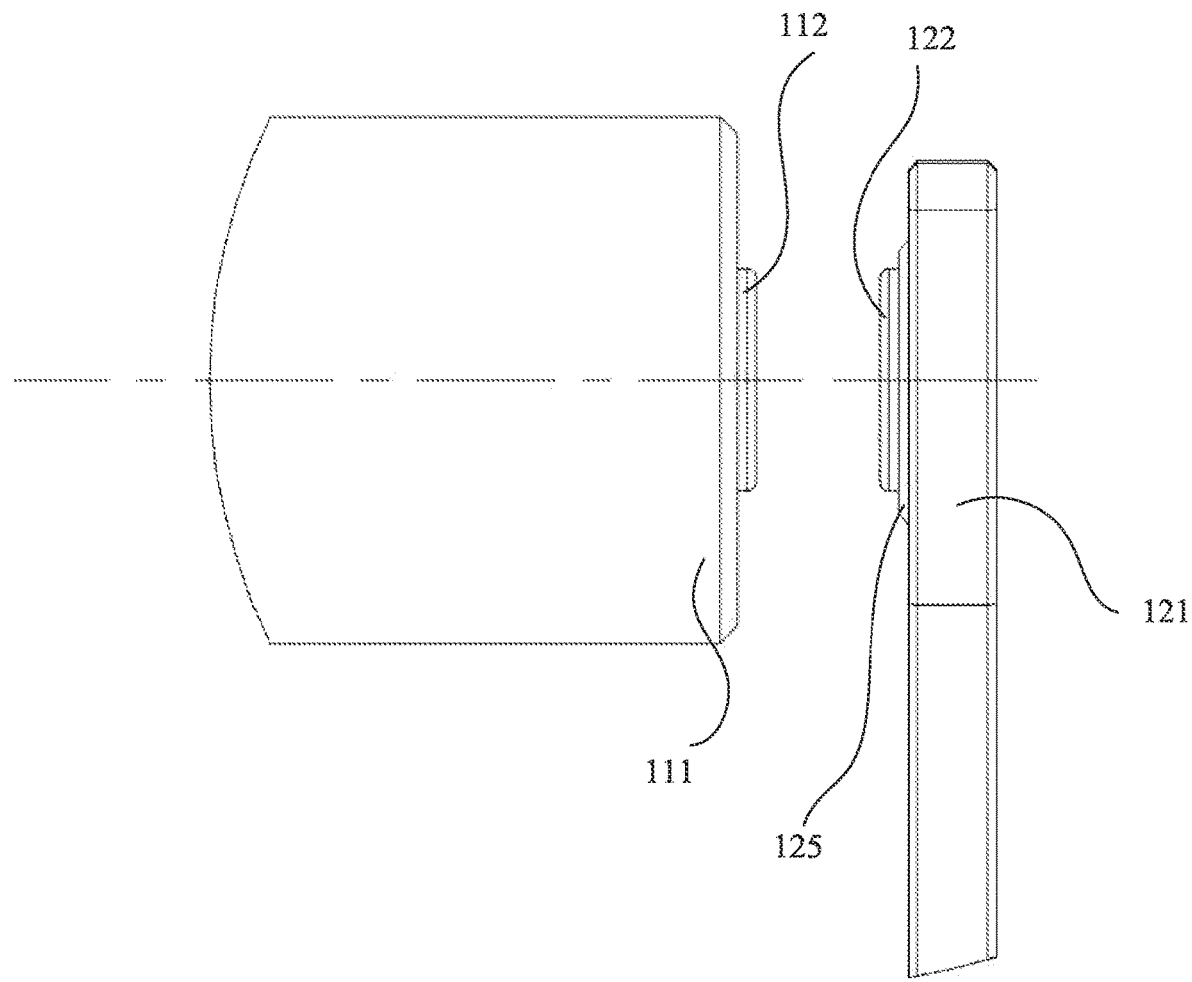
FIG. 9 is a schematic view of a brake apparatus according to yet another embodiment of present application.

In order to avoid that undesirable attraction force between the second magnet 122 and the locking shaft 114 and/or between the brake component 12 and the first magnet 112 caused by poorly control of such second positional deviation and second orientation deviation, the second magnet 122 may protrude a second distance $h_2$ from the brake end 121, as shown in FIG. 8. The second distance $h_2$ can reduce the attractive force between the second magnet 122 and the locking shaft 114 and/or between the brake component 12 and the first magnet 112, and increase the repulsive force between the second magnet 122 and the locking shaft 114 and/or between the brake component 12 and the first magnet 112. In some other embodiments, the brake component 12 and/or the locking shaft 114 of the locking component 11 may be made of non-magnetic materials such as stainless steel or aluminum alloy. In some other embodiments, a mounting seat 125 may be provided on the brake end 121, as shown in FIG. 9. The second magnet 122 may be attached to the mounting seat 125. The mounting seat 125 may be tapered toward a side where the locking component 11 is located while ensuring that the second magnet 122 can be stably attached to the mounting seat 125. That is, the mounting seat 125 may have a truncated cone shape. Through such a configuration, the mounting seat 125 may accommodate the second magnet 122 with a larger range of second orientation deviation due to manufacturing and/or assembling errors. Therefore, such configuration can facilitate positioning and mounting the second magnet 122, thereby reducing the difficulty of mounting the second magnet 122.

Figure 10:
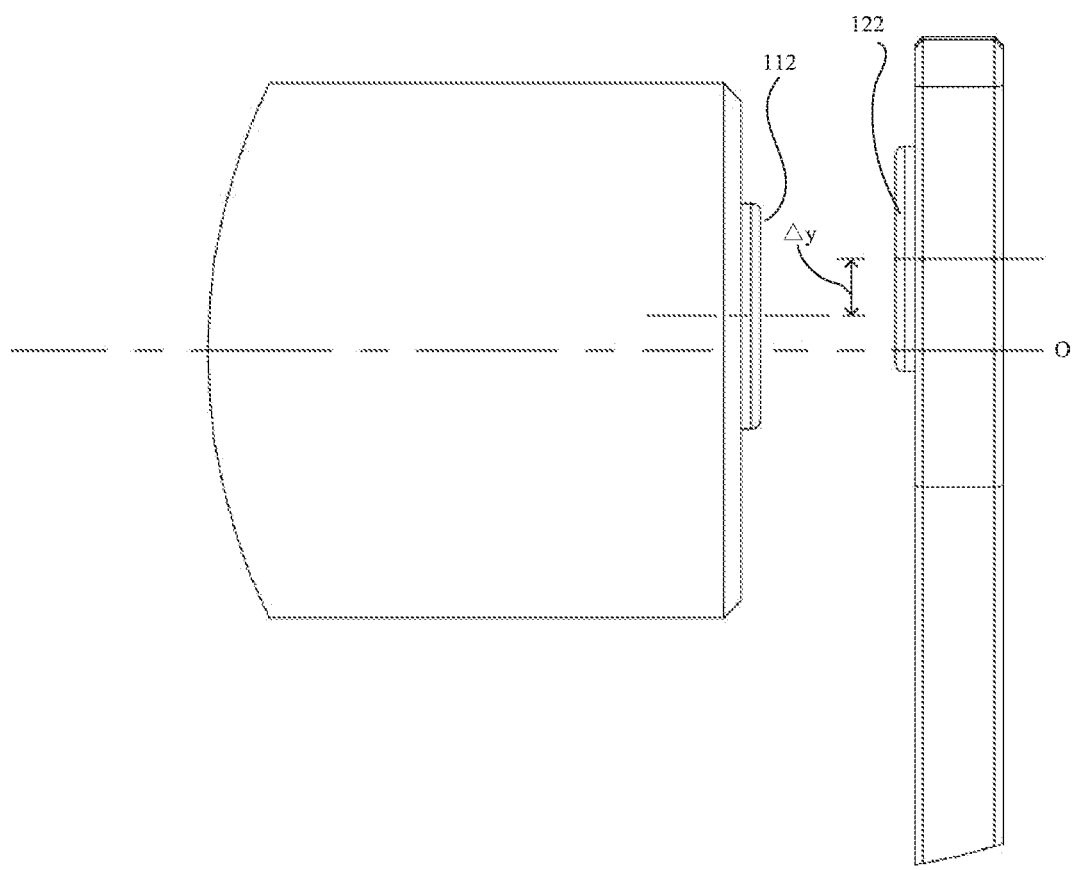
FIG. 10 schematically shows a possible positional deviation between a first magnet and a second magnet.
Figure 11:
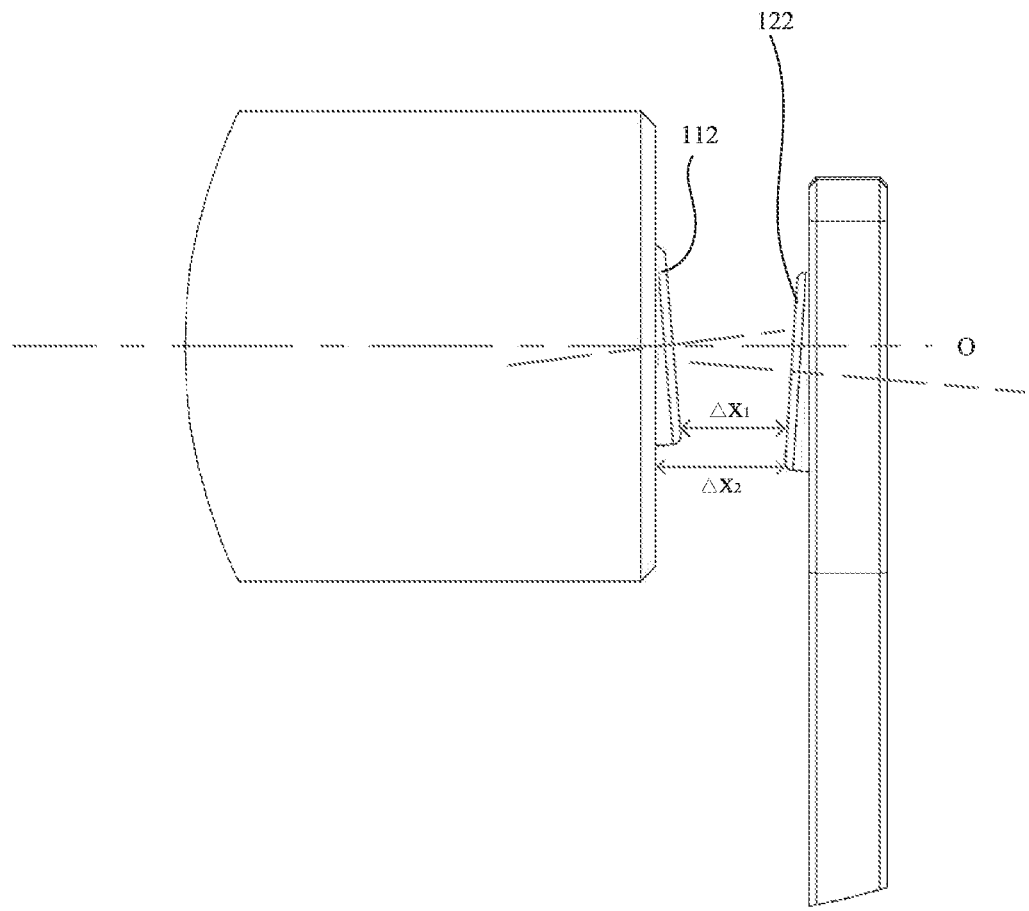
FIG. 11 schematically shows a possible orientation deviation between a first magnet and a second magnet.

In some embodiments, a size of the first magnet 112 may be the same as sizes of the second magnets 122. In addition, the size of the first magnet 112 and the sizes of the second magnets 122 can be set as large as possible to ensure that there can be sufficient repulsive force between the first magnet 112 and the second magnet 122. In this case, taking the first magnet 112 and the second magnet 122 each of which having a cylinder shape as an example, the ideal mounting state of the brake apparatus 1 is that: the first magnet 112 and the second magnets 122 have the same size, a center line (for example, an axis) of the first magnet 112 coincides with the axis of the locking shaft 114, and during the rotation of the brake component 12, the axes of second magnets 122 may coincide with the axis of the locking shaft 114 at different moments, such that the first magnet 112 and the second magnets 122 may face each other at the different moments. However, during the assembling the brake apparatus 1 in practice, due to manufacturing or assembling errors, for the entire brake apparatus 1, there may also be a third positional deviation and a third orientation deviation. The third positional deviation may be, for example, a relative parallel offset Δy between the axis of the first magnet 112 and the axis of the second magnet 122, as shown in FIG. 10. The third orientation deviation may be, for example, a relative axis tilt between the axis of the first magnet 112 and the axis of the second magnet 122 and/or a combination of the relative parallel offset and the relative axis tilt, as shown in FIG. 11. Therefore, in this application, the distance from the first magnet 112 to the rotary axis of the motor rotor 21 being substantially the same as the distance from the second magnet 122 to the rotary axis of the motor rotor 21 may further include the presence of the third positional deviation and/or the third orientation deviation. In this case, in some embodiments, in order to ensure sufficient repulsive force between the first magnet 112 and the second magnet 122, the first magnet 112 and the second magnets 122 can be provided to satisfy the following conditions: $\Delta y \leq r$, $\Delta x_2 > \Delta x_1$, where $\Delta x_1$ is a shortest distance between the first magnet 112 and the second magnet 122 when the first and second magnets 112 and 122 face each other, $\Delta x_2$ is a shortest distance from the first magnet 112 to the brake component 12 or from the second magnet 122 to the locking component 11 (for example, the locking end 111) when the first magnet 112 and the second magnet 122 face each other.

The operation process of brake apparatus 1 according to the present application is described below, in which the locking end 111 of the locking member 11 is inserted into the gap 123 between adjacent brake ends 121 of the brake member 12 and the brake component 12 is mounted on the motor rotor 21.

When the locking end 111 receives a brake instruction to release the brake component 12, the locking end 111 releases the brake component 12, and the brake component 12 rotates with the motor rotor 21 at a high speed. When the locking end 111 receives a brake instruction to lock the brake component 12, the locking end 111 can move toward the brake end 121 according to the brake instruction to lock the brake component 12. As the applicants have known, when the locking end moves toward the brake end according to the brake instruction to lock the brake component, the locking end is likely to apply great impact force on a current brake end that rotates at a high speed and faces the locking end at a certain moment, that is, it is likely that the locking end hits the current brake end of the brake component, which may cause deformation of the current brake end of the brake component, shorten the service life of the brake component, and may also bring an undesirable safety impact on other parts in the robot joint. However, in the embodiments of the present application, by providing the brake apparatus 1 with the first magnet 112 and the second magnets 122 that can generate the repulsive force therebetween, the impact force of the locking end 111 on the current brake end 121 of the brake component 12 can be reduced, such that rather than hitting the current brake end 121 of the brake component 12, the locking end 111 is smoothly inserted into the gap 123 between the current brake end 121 and an adjacent and subsequent brake end to engage with the adjacent and subsequent brake end, so as to lock the brake component 12, thereby stopping the power mechanism 2. Therefore, the lock brake mechanism according to the present application can realize a smooth and safe brake functionality.

However, the present application is not limited thereto, and the brake apparatus 1 according to the embodiment of the present application can also be applied to mechanical devices with other types of brake apparatus.

The present application may also provide a robot joint. The robot joint may include a housing, an electric motor including a rotor and a stator fixedly connected to the housing, and a brake apparatus 1 as described in any of the above embodiments. The brake component of the brake apparatus 1 can be connected to the rotor, so as to stop the rotor.

The present application may also provide a robot. The robot may include a plurality of connecting arms and a plurality of robot joints as described above. The plurality of connecting arms can be connected sequentially through the plurality of robot joints.

Those skilled in the art can understand that the structures shown in FIGS. 1 to 11 are only examples, and do not constitute a limitation of the application of the solution of the present application to other devices.

Various technical features of the embodiments described above can be arbitrarily combined. In order to simplify the description, all possible combinations of various technical features in the above embodiments have not been described. However, as long as there is no contradiction in the combination of these technical features, it should be considered as that all of them fall within the scope recorded in this specification.

The above described embodiments only present several implementation manners of the present application, and descriptions thereof are more specific and detailed, but they cannot be understood as limiting the scope of the application patent. It should be noted that, to those of ordinary skill in the art, several modifications and improvements can be made without departing from the concept of the present application, which all fall within the protection scope of the present application. Therefore, the protection scope of this application patent shall be subject to the appended claims.

What is claimed is:

1. A brake apparatus for a rotating component, comprising:
    a locking component comprising a locking end provided with a first magnet; and
    a brake component comprising a mounting portion connected to the rotating component and a plurality of brake ends provided on the mounting portion along a circumferential direction of the mounting portion, wherein each of the plurality of brake ends is provided with a second magnet,
    wherein the locking end is configured to lock the brake component rotating with the rotating component according to a received brake instruction;
    a side of the first magnet facing the brake component is configured to have a same polarity as sides of the second magnets facing the locking component; and
    a distance from the first magnet to a rotary axis of the rotating component is substantially the same as distances from the second magnets to the rotary axis of the rotating component.

2. The brake apparatus according to claim 1, wherein the first magnet protrudes a first distance from the locking end.

3. The brake apparatus according to claim 1, wherein the locking end defines a first opening, and the first magnet is provided in the first opening.

4. The brake apparatus according to claim 1, wherein the locking end has a truncated cone shape.

5. The brake apparatus according to claim 1, wherein the second magnet protrudes a second distance from the brake end.

6. The brake apparatus according to claim 1, wherein each brake end defines a second opening, and the second magnet is provided in the second opening.

7. The brake apparatus according to claim 1, wherein the brake end is provided with a mounting seat, and the second magnet is attached to the mounting seat.

8. The brake apparatus according to claim 7, wherein the mounting seat has a truncated cone shape.

9. The brake apparatus according to claim 1, wherein the locking end locks the brake component by extending into a gap between two adjacent brake ends.

10. The brake apparatus according to claim 1, wherein the first magnet is disposed on the locking end through adhesive, interference fit, or threaded coupling, and the second magnets are disposed on the brake end through adhesive, interference fit, or threaded coupling.

11. The brake apparatus according to claim 1, wherein the locking component and/or the brake component are made of non-magnetic materials.

12. The brake apparatus according to claim 1, wherein the first magnet is cylindrical, and the second magnets are cylindrical.

13. The brake apparatus according to claim 12, wherein the first magnet and the second magnets have the same size.

14. The brake apparatus according to claim 13, wherein the first magnet and the second magnets are provided to satisfy the following conditions:

$$\Delta y \leq r,$$

$$\Delta x_2 > \Delta x_1,$$

wherein $\Delta y$ is a relative parallel offset between an axis of the first magnet and an axis of the second magnet, r is a radius of the first magnet or the second magnet, $\Delta x_1$ is a shortest distance between the first magnet and the second magnet when the first magnet and the second magnet face each other, and $\Delta x_2$ is a shortest distance from the first magnet to the brake component or from the second magnet to the locking component when the first magnet and the second magnet face each other.

15. A robot joint comprising:
a housing;
an electric motor comprising a rotor and a stator fixedly connected to the housing; and
a brake apparatus configured to stop the rotor, wherein, the brake apparatus comprises:
a locking component comprising a locking end provided with a first magnet; and
a brake component comprising a mounting portion connected to the rotor and a plurality of brake ends provided on the mounting portion along a circumferential direction of the mounting portion, wherein each of the plurality of brake ends is provided with a second magnet,
wherein, the locking end is configured to lock the brake component rotating with the rotor according to a received brake instruction;
a side of the first magnet facing the brake component is configured to have a same polarity as sides of the second magnets facing the locking component; and
a distance from the first magnet to a rotary axis of the rotor is substantially the same as distances from the second magnets to the rotary axis of the rotor.

16. A robot comprising a plurality of connecting arms and a plurality of robot joints, the plurality of connecting arms being connected sequentially through the plurality of robot joints, each of the plurality of robot joints comprising:
a housing;
an electric motor comprising a rotor and a stator fixedly connected to the housing; and
a brake apparatus configured to configured to stop the rotor,
wherein the brake apparatus comprises:
a locking component comprising a locking end provided with a first magnet; and
a brake component comprising a mounting portion connected to the rotor and a plurality of brake ends provided on the mounting portion along a circumferential direction of the mounting portion, wherein each of the plurality of brake ends is provided with a second magnet,
wherein the locking end is configured to lock the brake component rotating with the rotor according to a received brake instruction;
a side of the first magnet facing the brake component is configured to have a same polarity as sides of the second magnets facing the locking component; and
a distance from the first magnet to a rotary axis of the rotor is substantially the same as distances from the second magnets to the rotary axis of the rotor.

* * * * *